No. 813,070. PATENTED FEB. 20, 1906.
D. B. YODER.
ATTACHMENT FOR WOOD BORING BRACES.
APPLICATION FILED JULY 18, 1905.
2 SHEETS—SHEET 2.
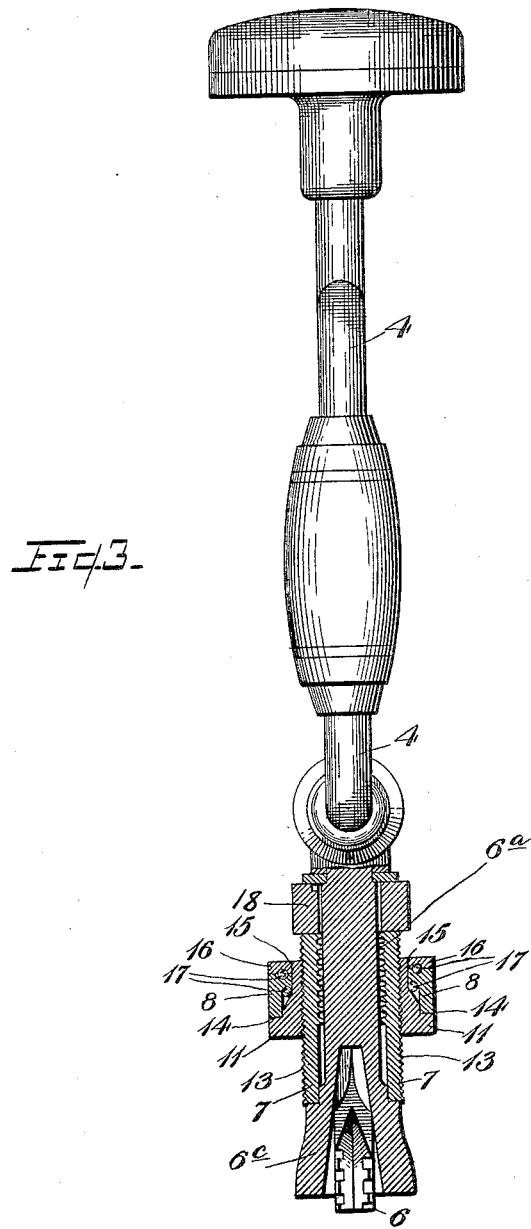
Witnesses
W. H. Ourand
Geo. E. Tew
Inventor
David B. Yoder,
By Milo B. Stevens & Co.
Attorneys.

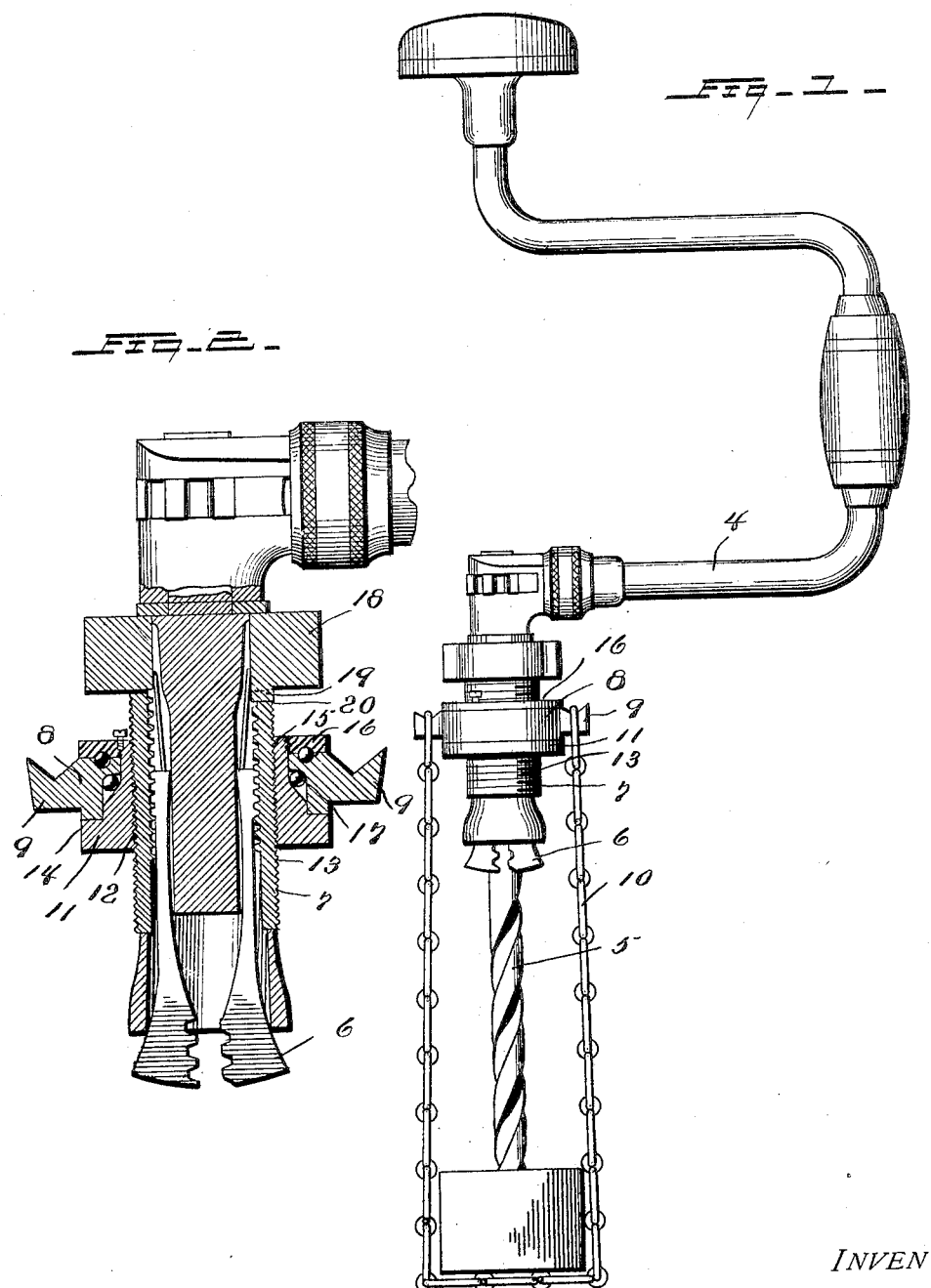

UNITED STATES PATENT OFFICE.

DAVID B. YODER, OF GUTHRIE, OKLAHOMA TERRITORY.

ATTACHMENT FOR WOOD-BORING BRACES.

No. 813,070.     Specification of Letters Patent.     Patented Feb. 20, 1906.

Application filed July 18, 1905. Serial No. 270,174.

*To all whom it may concern:*

Be it known that I, DAVID B. YODER, a citizen of the United States, residing at Guthrie, in the county of Logan, Oklahoma Territory, have invented new and useful Improvements in Attachments for Wood-Boring Braces, of which the following is a specification.

My invention is an attachment for an ordinary wood-boring brace to enable the latter to be used for drilling metal; and it is characterized particularly by the adaptation of the ordinary clamping-sleeve as a means for feeding the work to the drill in addition to its ordinary function of clamping the jaws. This is done, too, in such manner that any friction or pressure due to the feed tends to tighten the grip of the jaws on the shank of the bit or drill.

The invention is illustrated in the accompanying drawings, in which—

Figure 1 is an elevation of the brace, showing the application of the invention thereto. Fig. 2 is a central vertical section. Fig. 3 is a section at right angles to that of Fig. 2.

Referring specifically to the drawings, 4 denotes the U-crank arm of an ordinary wood-boring brace. The bit 5 is held by means of jaws 6, which are carried within grooves in the sides of the spindle $6^a$ of the brace, on which the clamping-sleeve 7 turns. The spindle is formed integral with a ring $6^c$, at the outer end thereof. The inner ends of the jaws have teeth $6^b$, which extend through the slots to engagement with screw-threads on the inside of the sleeve, whereby the jaws are drawn in or forced out to grip or release the bit when the clamping-sleeve is turned in one direction or the other. The sleeve 7 is rotated to open or close the jaws by a finger piece or ring 8, which is rotatably mounted on the spindle and has a projecting stud 19, which fits in a notch 20 in the upper end of the sleeve. This finger-piece is used for the sake of convenience, because the barrel would be difficult or inconvenient to grasp and hold by hand.

At 8 is indicated a ring having projecting arms 9, which receive the free ends of a chain 10, passing around the work to be drilled. The ring 8 fits loosely on a sleeve 11, having a threaded bore 12. The sleeve 7 is threaded externally, as at 13, and receives the sleeve 11. The threads are fine to give the requisite slow feed, and are opposite in direction to the inner threads, so that the strain of the feed tends to tighten the jaws. The lower end of the sleeve 11 is formed with an outwardly-extending flange 14, and the opposite end is externally threaded, as at 15, to receive a screw-ring 16. The ring 8 fits loosely on the sleeve 11 between the flange 14 and the ring 16. Antifriction-balls 17 are placed between the parts to enable the ring 8 to turn freely on the sleeve 11, the parts being held together by the ring 16.

In operation as a drill the parts are arranged as shown in Fig. 1 and the crank is turned to drive the drill. If the parts be allowed to run free, the ring 14 will turn with the spindle and sleeve, the resistance or friction therebetween being greater than the friction between the rings 11 and 8, particularly in consequence of the ball-bearings; but if the ring 11 be held by hand against rotation it will travel up on the thread 13 in consequence of the rotation of the crank and draw the drill to the work, thus providing an automatic and power feed. The feed can be instantly stopped by releasing the ring 11.

The attachment can remain on the brace when it is to be used for boring wood by removal of the chain 10. It is therefore handy and convenient and at all times ready for use as either a drill or brace.

The parts herein described can be readily applied to any ordinary wood-boring brace, no specially-constructed brace being required. The only change necessary is to cut a thread on the sleeve which operates the jaws and apply the rings thereto.

I claim—

1. The combination with the jaw-clamping sleeve of a boring-brace, said sleeve being threaded externally and driven by the ordinary rotation of the brace, of an internally-threaded member working on said sleeve, and a clamping-chain, the ends of which are carried by the aforesaid member.

2. The combination with the jaw-clamping sleeve of a boring-brace, said sleeve being threaded externally and rotated by the ordinary rotation of the brace, of an internally-threaded member working on said sleeve, a rotatable ring carried by the aforesaid member, and a clamping-chain, the ends of which are secured to the ring.

3. The combination with a boring-brace having a jaw-clamping sleeve rotatable with the spindle of the brace, said sleeve being threaded exteriorly, of an internally-threaded inner ring on said sleeve, the threads being arranged to cause the ring to travel inwardly when the brace is turned to drive the bit or drill, an outer ring rotatably mounted on said ring and having a clamping-chain attached thereto, and antifriction-bearings between the rings constructed to give less friction therebetween than between the sleeve and the inner ring, so that normally the sleeve and the inner ring turn together.

In testimony whereof I have signed my name to this specification in the presence of two subscribing witnesses.

DAVID B. YODER.

Witnesses:
R. R. CARLIN,
D. STEVENS.